United States Patent [19]

Bessemer et al.

[11] Patent Number: 5,464,335
[45] Date of Patent: Nov. 7, 1995

[54] VACUUM TANK FOR VACUUM SIZING APPARATUS

[75] Inventors: Robert H. Bessemer, York, Pa.; Stanley J. Yeoman, Milton Keynes, United Kingdom

[73] Assignee: The Conair Group, Inc., Pittsburgh, Pa.

[21] Appl. No.: 298,325

[22] Filed: Aug. 30, 1994

[51] Int. Cl.[6] .................................................. B29C 47/88
[52] U.S. Cl. .......................... 425/71; 425/86; 425/326.1; 425/388
[58] Field of Search .................................. 425/67, 69, 71, 425/326.1, 388, 86; 264/211.13

[56] References Cited

U.S. PATENT DOCUMENTS

| | | | |
|---|---|---|---|
| 3,538,210 | 11/1970 | Gatto | 425/71 |
| 3,576,929 | 4/1971 | Turner et al. | 425/326.1 |
| 4,220,620 | 9/1980 | Clifford | 425/71 |
| 4,783,291 | 11/1988 | Pagan | 425/71 |
| 5,008,051 | 4/1991 | DeCoursey et al. | 264/40.3 |
| 5,340,295 | 8/1994 | Preiato et al. | 425/71 |
| 5,346,379 | 9/1994 | Wölfl et al. | 425/67 |

*Primary Examiner*—Robert J. Warden
*Assistant Examiner*—Theresa T. Snider
*Attorney, Agent, or Firm*—Buchanan Ingersoll; George Raynovich, Jr.

[57] ABSTRACT

A vacuum tank for a vacuum sizing apparatus is provided. The vacuum tank is especially suited to control with precision the size and cooling of small sized plastic extrudate. The vacuum tank has coolant tubes between the double walls of the tank so that the coolant is not directly exposed to the extrudate. A water make-up tube having very small holes in it is disposed below the surface of the water in the vacuum tank so that make-up water will enter the tank with a minimum of turbulence being created. Slots provided in a rotatable water over-flow tube permit the level of the water within the vacuum tank to be adjusted and the slots provide a non-turbulent exit of over-flow water from the vacuum tank. A pre-skin block is positioned within the vacuum tank and is designed to minimize turbulence of water at the pre-skinning position within the tank.

14 Claims, 5 Drawing Sheets

VACUUM TANK FOR VACUUM SIZING APPARATUS

BACKGROUND OF THE INVENTION

1. Field of the Invention

This invention relates to an apparatus for cooling molten plastic extrudate as it leaves the extruder in order to hold the size and shape of the extrudate as the molten plastic cools and hardens. The vacuum sizing apparatus has a vacuum tank containing water through which the extrudate passes as it cools and hardens. The vacuum tank has provisions to minimize the turbulence of the water within the tank and to prevent contamination of the water in handling small diameter tubing and other small size extrudate.

2. Description of the Prior Art

Efforts have been made in the plastics industry to provide for the controlled cooling and accurate sizing of molten plastic extrudate after it leaves the plastic extruder. The extrudate can easily be deformed if excessive pressure is applied to the outer surface of the extrudate. To prevent this type of deformation, vacuum cooling and sizing tanks have been developed that have a water bath within a vacuum chamber which prevents excessive pressure from being applied to the surface of the extrudate as it cools. An example of such an arrangement is found in U.S. Pat. No. 5,340,295 and entitled "VACUUM SIZING APPARATUS WITH CONTROLLED VACUUM".

When very small diameter tubing or other small extrudate is cooled in a vacuum chamber, it is essential to control the temperature of the water closely, and to minimize turbulence within the water. For some extrudate, it is desirable to provide for pre-skinning of the extrudate as it enters the vacuum chamber.

In prior cooling and sizing devices, unwanted turbulence occurs when water is added to the tank and when water is removed from the tank to control the water level. The present invention provides a vacuum tank for a vacuum sizing apparatus that is particularly suited for the cooling and sizing of small diameter medical tubing, electronic shrink tubing, and fiber optic cable where close tolerances are required for the finished product.

SUMMARY OF THE INVENTION

In accordance with the present invention there is provided a vacuum tank containing water and forming a part of a vacuum sizing apparatus utilized for precision cooling and sizing of a molten plastic extrudate. The vacuum tank is an elongated tank structure having an extrudate inlet at one end and an extrudate outlet at the other end. The tank structure has an inner wall and an outer wall spaced apart from each other. Coolant circulation means is positioned between the inner wall and the outer wall to cool the interior of the tank. Make-up water means extends longitudinally in the tank to add water to the tank without creating water turbulence within the tank. An adjustable water over-flow means extends longitudinally in the tank to remove excess water from the tank without creating water turbulence within the tank. A pre-skin block is secured to the extrudate inlet end of the elongated tank structure within the tank to initially receive and size the extrudate.

Further in accordance with the present invention, there is provided a vacuum tank containing water and forming part of a vacuum sizing apparatus utilized for precision cooling and sizing of a molten plastic extrudate. The vacuum tank is formed as an elongated tank structure having an extrudate inlet at one end and an extrudate outlet at the other end with seal means sealing the extrudate inlet and extrudate outlet. The tank structure has a "U" shaped inner wall and a "U" shaped outer wall extending in parallel spaced relation to each other through the length of the tank structure. Coolant circulation means including tubing positioned between the inner wall and the outer wall receives coolant pumped through the tubing and circulates the coolant in a tortuous path between the inner wall and the outer wall. Make-up water means including an elongated tube positioned longitudinally within the tank adjacent the bottom of the tank has holes formed in it to direct water from within the tube downwardly and outwardly toward the bottom and sides of the tank with the elongated tube being at all times below the water level within the tank. An adjustable water over-flow means is provided that includes an elongated cylindrical tube positioned longitudinally within the tank and having a slot extending along its length so that water entering the slot is conducted through the cylindrical tube and into an over-flow drain conduit for removal from the tank. The cylindrical tube is rotatable about its axis to position the slot at variable distances above the bottom of the tank to thereby control the depth of water within the tank. A pre-skin block is secured to the extrudate inlet end of the elongated tank structure within the tank and the pre-skin block is formed as a solid block having a groove to initially receive and size the extrudate. A channel extends around the periphery of the pre-skin block to receive cooling water with a minimum of turbulence and the block is removably secured to the inside of the tank structure.

Accordingly, a principal object of the present invention is to provide an improved vacuum tank for a vacuum sizing apparatus for precision cooling and sizing of plastic extrudate.

Another object of the present invention is to provide a vacuum tank in which water is added and over-flow water is removed with a minimum of turbulence occurring within the tank.

Another object of the present invention is to provide a vacuum tank in which the major cooling of the interior of the tank occurs by a coolant that is pumped through tubing located between the double walls of the tank.

These and other objects of the present invention will be more completely disclosed and described in the following specification, the accompanying drawings and the appended claims.

DESCRIPTION OF THE PREFERRED EMBODIMENT

Figure 1:
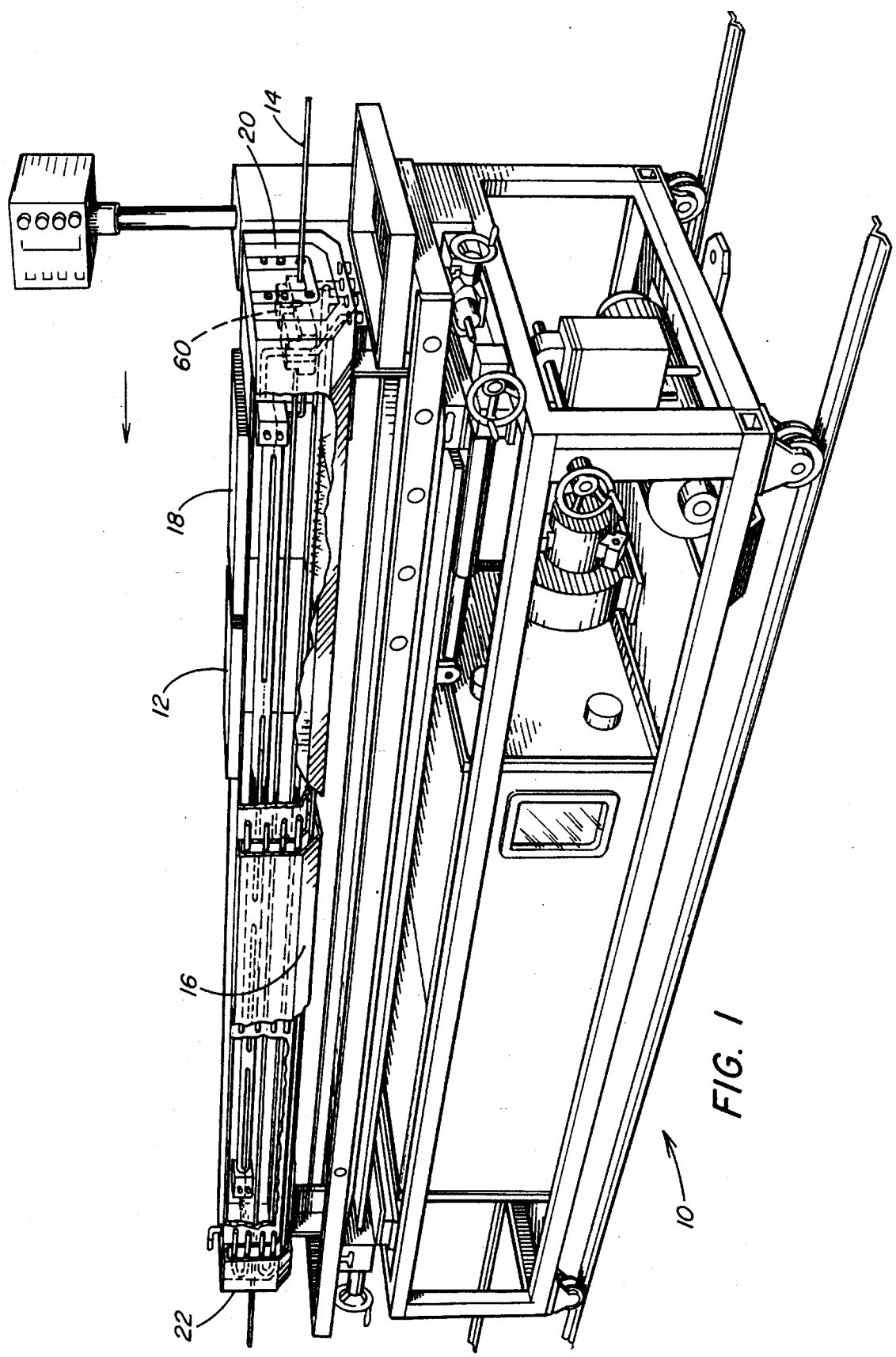
FIG. 1 is a perspective view, with portions of the tank cut away, of a vacuum sizing apparatus utilizing the vacuum tank of the present invention.

Referring to the drawings and particularly to FIG. 1, a vacuum sizing apparatus 10 having a vacuum tank 12 receives extrudate 14 that is extruded by a molten plastic extruder (not shown). The vacuum tank body 16 has a lid 18 and an inlet end wall 20 and an outlet end wall 22.

The vacuum tank 12 of the present invention is utilized with a vacuum sizing apparatus of the type disclosed and claimed in U.S. Pat. No. 5,340,295 and entitled "VACUUM SIZING APPARATUS WITH CONTROLLED VACUUM". Reference may be had to the description contained in U.S. Pat. No. 5,340,295 for the operation of the vacuum sizing apparatus 10. The present invention is directed to the vacuum tank 12 described in detail herein.

Figure 2:
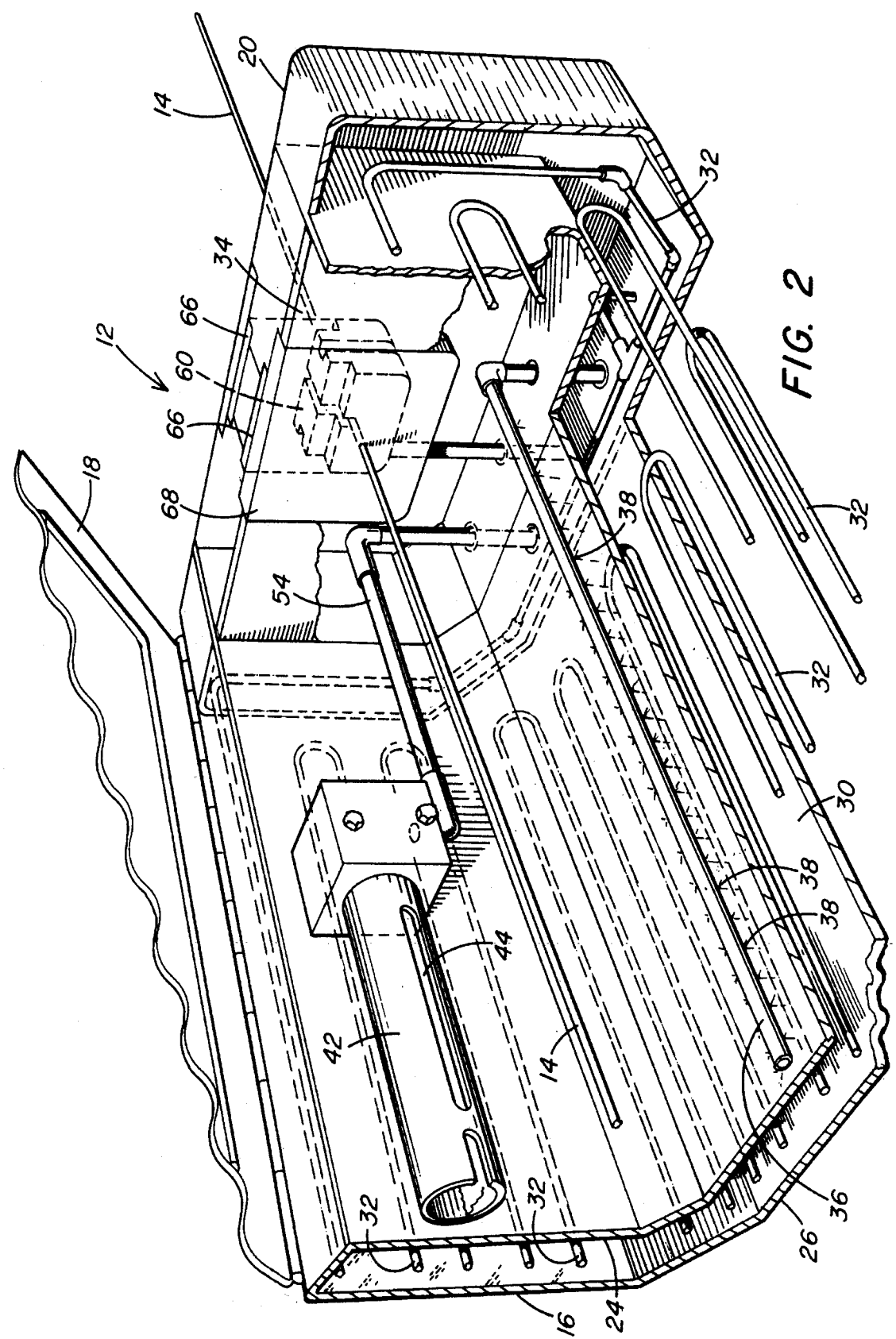
FIG. 2 is a perspective view of a portion of the inlet end of the vacuum tank of the present invention as viewed from inside the tank.
Figure 3:
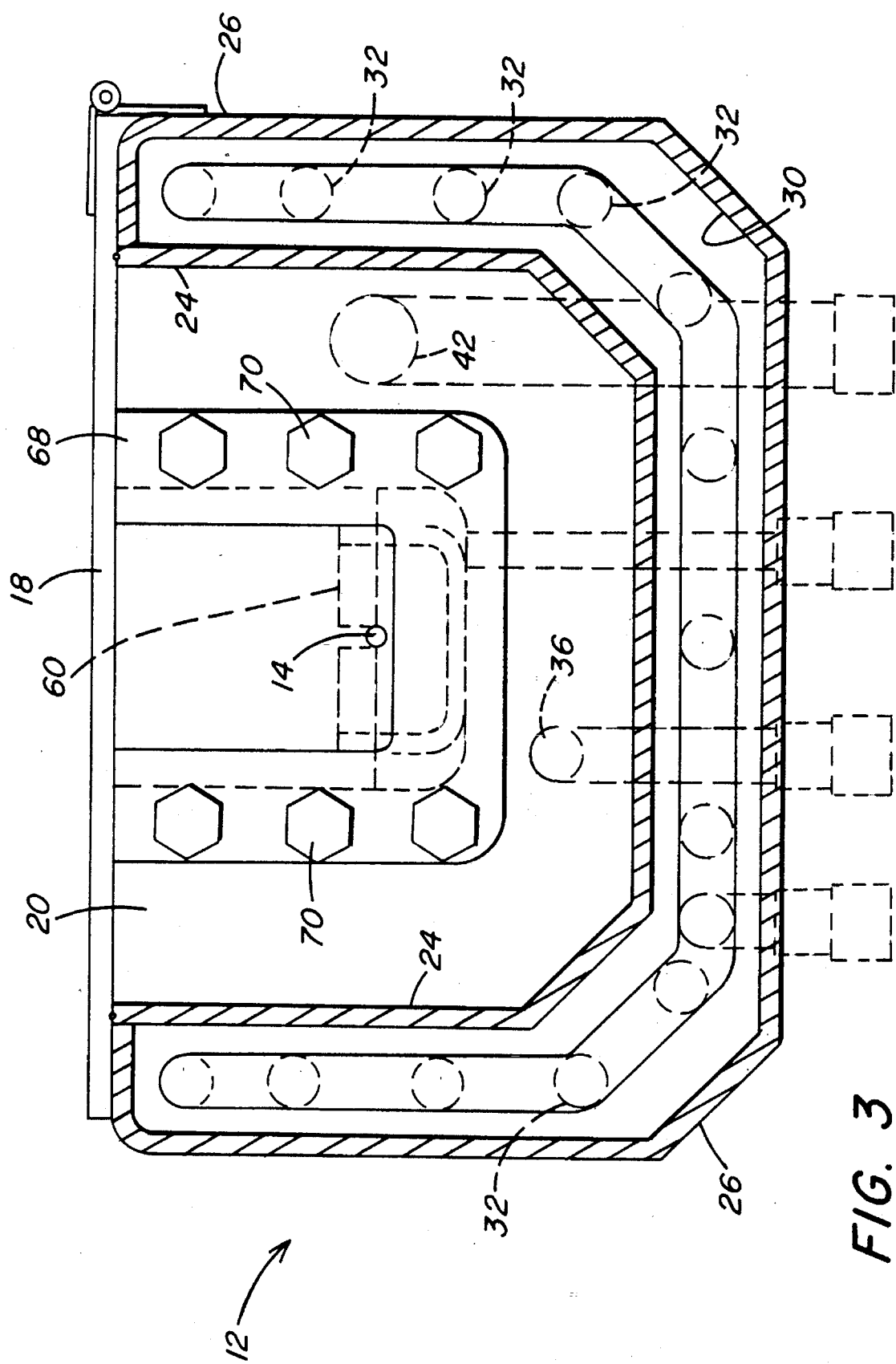
FIG. 3 is a sectional elevation of the tank of FIGS. 1 and 2 viewed toward to inlet end of the tank.

Referring now to FIGS. 1, 2 and 3, the vacuum tank 12 has a "U" shaped inner wall 24 and a "U" shaped outer wall 26 which extend parallel to each other the length of the tank 12 and which form a trough that is covered by lid 18 to provide a vacuum tight chamber within tank 12. The outer wall 26 has an insulated coating 30 formed on its inner surface so that coolant directed through coolant tubing 32 positioned between inner wall 24 and outer wall 26 has the effect of cooling the internal portion of tank 12 and preventing heat exchange through the outer wall 26.

The coolant tubing 32 extends the entire length of tank 12 and directs coolant in a tortuous path between the inner wall 24 and outer wall 26 of the tank 12. The coolant is pumped through coolant tubing 32 in conventional fashion and the coolant is passed through a heat exchanger to cool the coolant and remove heat from the interior of vacuum tank 12. The specific design of the coolant system forms no part of the present invention except that the coolant must be circulated throughout the length of the tank between the inner wall 24 and outer wall 26 of the tank. The seal 34 seals the inlet through which extrudate 14 passes through inlet end wall 20.

Figure 4:
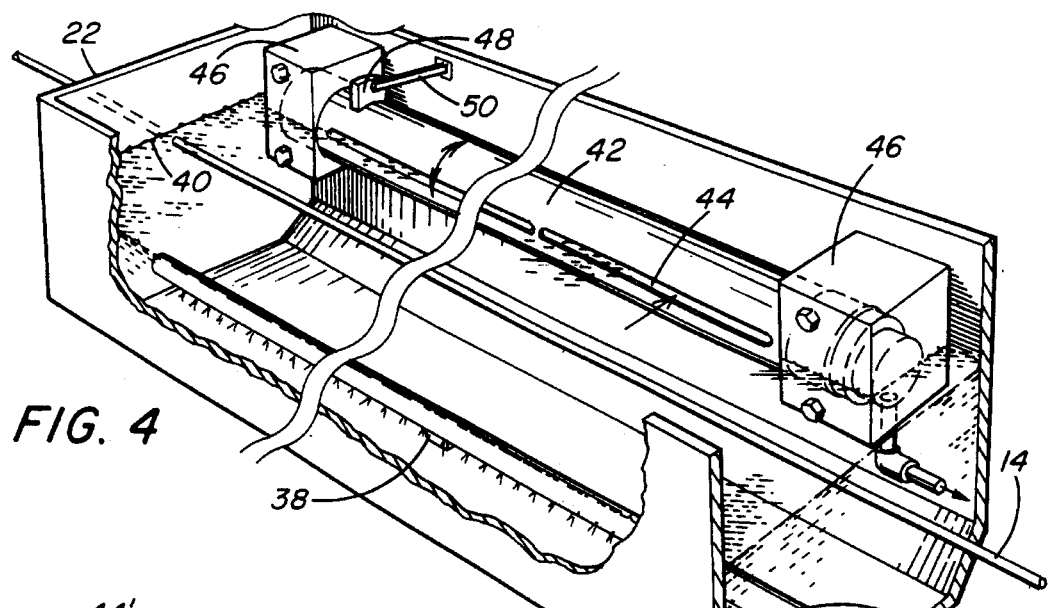
FIG. 4 is a perspective view of the outlet end of the tank of the present invention with the outer wall removed and with the lid of the tank removed.

A water make-up tube 36 (FIGS. 2–4) extends through a substantial portion of the length of tank 12. The make-up tube 36 has a plurality of holes 38 formed along the bottom of the tube. Holes 38 are preferably of a small size and are formed at 45° angles to the vertical on each side of the vertical diameter of the tube 36 so that make-up water that is emitted from tube 36 in small quantities through holes 38 is directed downwardly and outwardly from the axis of tube 38. A seal 40 is formed in the outlet end wall 22 where extrudate 14 passes through the end wall.

Figure 5:
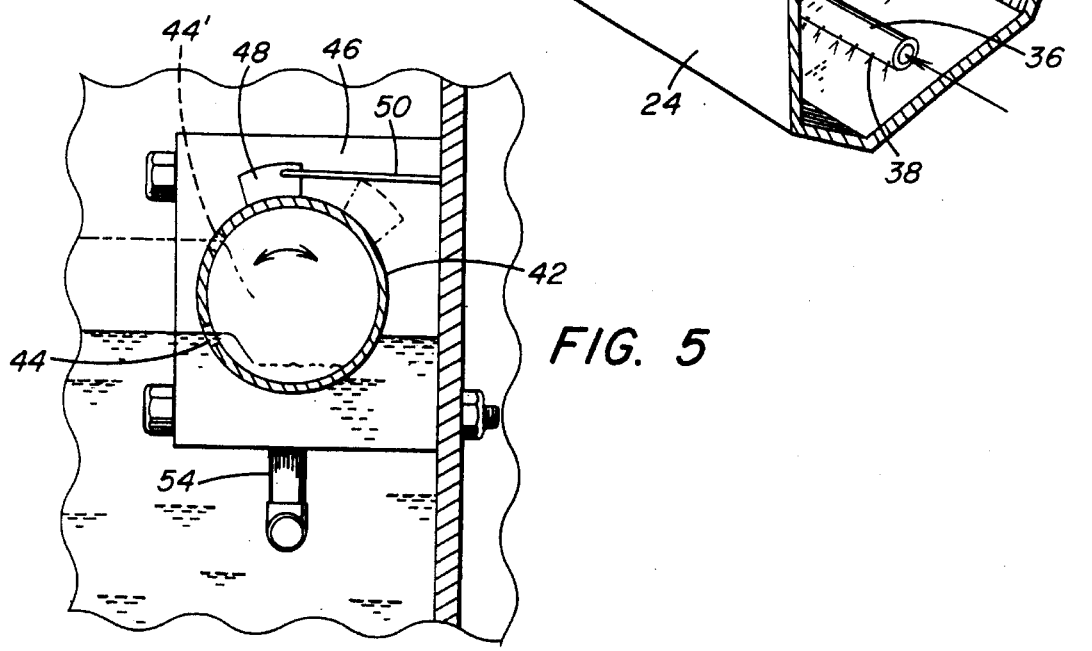
FIG. 5 is a detailed view of the adjustable water over-flow tube.
Figure 6:
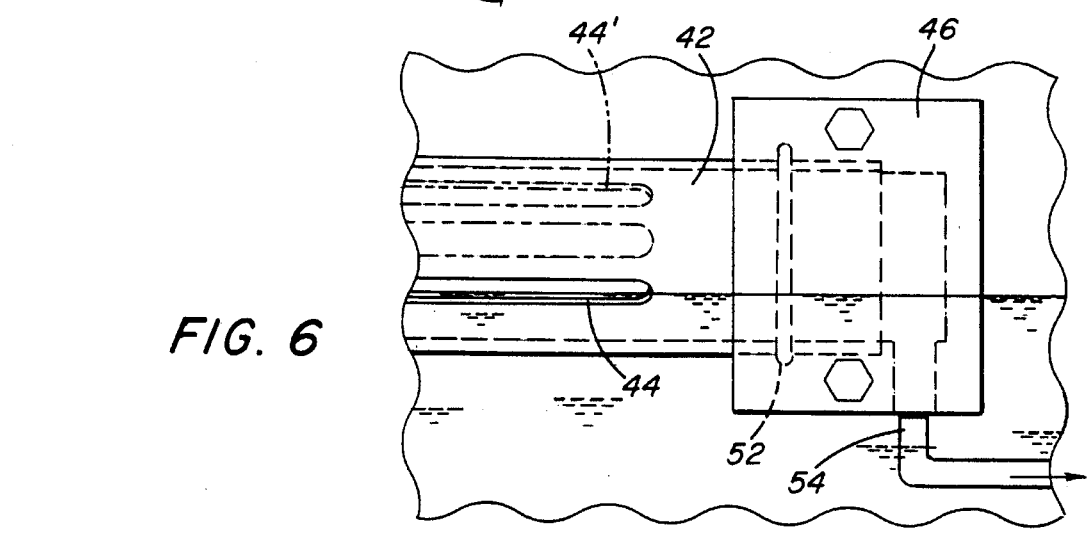
FIG. 6 is a partial elevation of the adjustable water over-flow tube.
Figure 7:
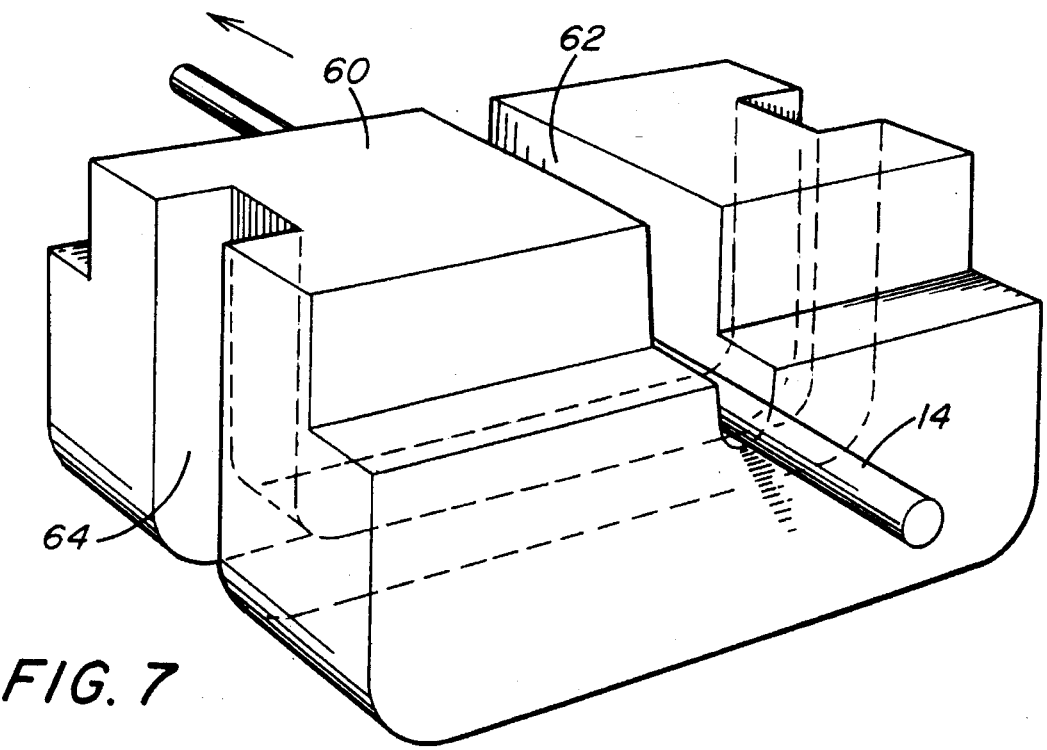
FIG. 7 is a perspective view of the pre-skin block of the present invention.
Figure 10:
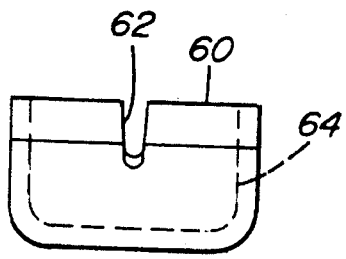
FIG. 10 is a front elevation of the pre-skin block.
Figure 9:
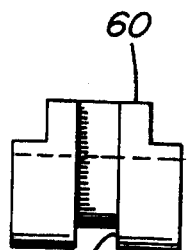
FIG. 9 is a side elevation of the pre-skin block.
Figure 8:
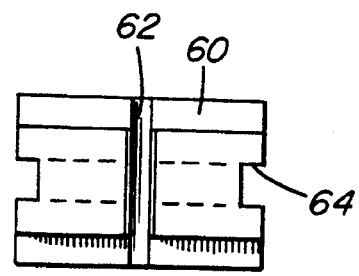
FIG. 8 is a top plan view of the pre-skin block.

A water over-flow tube 42 extends horizontally substantially the full length of tank 12 and has slots 44 extending substantially the full length of tube 42. The tube 42 is rotatably supported in support blocks 46 that are secured to the inner wall 24 of tank 12. As seen in FIGS. 5 and 6, the water over-flow tube 42 can be rotated so that the slots 44 may assume positions at varying levels above the bottom of tank 12. As an example, the slot 44 is shown rotated in FIGS. 5 and 6 to a position 44' which is substantially above the position of slot 44. By rotating the slots 44 to the desired height, the level of the water within tank 12 may be accurately controlled. The position control 48 with control lever 50 is fixed to the tube to control the position of the over-flow tube 42. As best seen in FIG. 6, the tube 42 is journaled for rotation within support block 46 and sealed by means of an O-ring seal 52. Outlet conduit 54 fixed to support block 46 communicates with the interior of over-flow tube 42 and removes over-flow water from the vacuum tank 12.

Because the slots 44 in water-flow tube 42 are positioned horizontally at the water level, water to be removed from vacuum tank 12 flows smoothly at the surface of the water within the tank 12 into slots 44 and there is a minimum of turbulence created by the removal of the water. In prior art vacuum tanks, standpipes have been utilized to remove excess water and a whirlpool effect has been noted at the standpipes as water was removed. The present invention prevents turbulence during water removal from the tank.

A pre-skin block 60 is attached to the inside of inlet end wall 20 of the vacuum tank 12 to initially size the extrudate 14 as it enters the vacuum tank 12. The pre-skin block 60 is preferably formed of an acetal resin sold commercially under the name "Delrin" by E. I. DuPont De Nemours & Co. The pre-skin block has been designed with a groove 62 formed to receive the particularly sized extrudate. A channel 64 is formed around the pre-skin block 60 to receive cooling water. The cooling water is directed around the pre-skin block between cover plates 66 that hold the pre-skin block in position between an auxiliary wall 68 and the inlet end wall 20. The cover plates are bolted by means of bolts 70 to hold the pre-skin block in position between auxiliary wall 68 and inlet end wall 20. It will be appreciated that the pre-skin block 60 will be utilized for a particularly sized extrudate 14 and that if different size or shape extrudate is processed, an appropriately sized pre-skin block 60 will be substituted into the tank 12 to accommodate that extrudate.

The improved vacuum tank 12 of the present invention is particularly suited for the precision cooling and sizing of small sized extrudate such as medical tubing, electronic shrink tubing and fiber optic cable. With medical tubing and fiber optic cable, particularly, it is essential that no impurities contaminate the plastic extrudate. Accordingly, the vacuum tank 12 of the present invention provides several features which permit precision sizing of the small extrudate and prevent contamination of the plastic. By providing the coolant tubes 32 between the inner and outer walls of the tubing, the major coolant exchange is isolated from the interior of the vacuum tank 12. Thus, large quantities of water are not introduced into the tank 12 and removed therefrom which increases the chance of impurities entering the tank. Even though the preferred coolant within tubes 32 is water, that coolant water is isolated from the interior of vacuum tank 12.

Accurate sizing of small-sized extrudate requires a minimum of water turbulence within the vacuum sizing tank 12. The water make-up tube 36 of the present invention with the great number of small sized holes 38 formed in it permits water to be added below the surface of the water within the tank 12 with a minimum of turbulence while adding water. Further, the amount of water added will be relatively small since the major heat exchange takes place through the use of coolant within coolant tubes 32. In a similar fashion, what little over-flow water must be removed from the vacuum tank 12 will be removed by flowing smoothly along the surface of the water through slots 44 in water over-flow tube 42 so that the water within tank 12 will remain calm and still at all times.

In the present invention, the pre-skin block 60 has been moved inside the vacuum tank 12 which provides for even cooling of the surface of extrudate 14 and utilizes the vacuum within tank 12 to pull the water inwardly as the extrudate 14 enters the vacuum tank 12. By providing channel 64 around pre-skin block 60, make-up water may be introduced around pre-skin block 60 with a minimum of turbulence to further maintain the water within vacuum tank 12 in a calm state.

According to the provisions of the patent statues, we have explained the principle, preferred construction and mode of operation of our invention and illustrated and described what we now consider to represent its best embodiment. However, it should be understood that, within the scope of the appended claims, the invention may be practiced otherwise than as specifically illustrated and described.

We claim:

1. A vacuum tank containing water and forming part of a vacuum sizing apparatus utilized for precision cooling and sizing of a molten plastic extrudate comprising:

an elongated tank structure having an extrudate inlet at one end and an extrudate outlet at the other end;

said tank structure having an inner wall and an outer wall spaced apart from each other;

coolant circulation means positioned between said inner wall and said outer wall to cool the interior of said tank structure;

make-up water means extending longitudinally in said tank structure to add water to said tank structure without creating water turbulence within said tank structure;

adjustable water over-flow means extending longitudinally in said tank structure to remove excess water from said tank structure without creating water turbulence within said tank structure; and a pre-skin block secured to the extrudate inlet end of said elongated tank structure within said tank structure to initially receive and size said extrudate.

2. The vacuum tank of claim 1 wherein said coolant circulation means comprises tubing positioned between said inner wall and said outer wall to receive pumped coolant and circulate said coolant in a tortuous path between said inner wall and said outer wall.

3. The vacuum tank of claim 1 wherein said make-up water means comprises an elongated tube positioned longitudinally within said tank structure adjacent the bottom of said tank structure, said elongated tube having a series of holes formed therein to direct water from within said tube downwardly and outwardly toward the bottom and sides of said tank structure, said elongated tube being at all times below the water level within said tank structure.

4. The vacuum tank of claim 1 wherein said adjustable water over-flow means comprises an elongated cylindrical tube positioned longitudinally within said tank structure and having slot means extending along its length so that water entering said slot means is conducted through said tube and into an over-flow drain conduit for removal from said tank structure; said elongated tube being rotatable about its axis to position said slot means at variable distances above the bottom of said tank structure whereby the depth of water within said tank structure may be adjusted.

5. The vacuum tank of claim 1 wherein said pre-skin block comprises a solid block having a groove to receive said extrudate, a channel extending around its periphery to receive cooling water and means to removably secure said block to said tank structure at the extrudate inlet end of said tank structure.

6. A vacuum tank containing water and forming part of a vacuum sizing apparatus utilized for precision cooling and sizing of a molten plastic extrudate comprising:

an elongated tank structure having an extrudate inlet at one end and an extrudate outlet at the other end; seal means sealing said extrudate inlet and said extrudate outlet;

said tank structure having a "U" shaped inner wall and a "U" shaped outer wall extending in parallel, spaced relation to each other through the length of said tank structure;

coolant circulation means including tubing positioned between said inner wall and said outer wall to receive coolant pumped through said tubing and circulate said coolant in a tortuous path between said inner wall and said outer wall;

make-up water means including an elongated tube positioned longitudinally within said tank structure adjacent the bottom of said tank structure, said elongated tube having a plurality of holes formed therein to direct water from within said tube downwardly and outwardly toward the bottom and sides of said tank structure, said elongated tube being at all times below the water level within said tank structure;

adjustable water over-flow means including an elongated cylindrical tube positioned longitudinally within said tank structure and having slot means extending along its length so that water entering said slot means is conducted through said cylindrical tube and into an over-flow drain conduit for removal from said tank structure; said cylindrical tube being rotatable about its axis to position said slot means at variable distances above the bottom of said tank structure whereby the depth of water within said tank structure may be adjusted; and a pre-skin block secured to the extrudate inlet end of said elongated tank structure within said tank structure, said pre-skin block being formed as a solid block formed of an acetal resin having a groove to initially receive and size said extrudate, a channel extending around its periphery to receive cooling water and means to removably secure said block to said tank structure.

7. The vacuum tank of claim 6 wherein said tank structure outer "U" shaped wall is insulated to retard transfer of heat therethrough.

8. The vacuum tank of claim 6 wherein said pre-skin block is constructed such that it may readily be replaced by another pre-skin block having a different size groove to accommodate a different size of extrudate.

9. The vacuum tank of claim 6 wherein said make-up water means has said elongated tube positioned so that said plurality of holes are directed downwardly at substantially a 45° angle from the vertical on each side of said elongated tube and said plurality of holes emit make-up water into said tank structure with minimum turbulence.

10. A vacuum tank containing water and forming a part of a vacuum sizing apparatus utilized for precision cooling and sizing of molten plastic extrudate comprising:

an elongated tank structure having an extrudate inlet at one end and an extrudate outlet at the other end;

said tank structure having an inner wall and an outer wall spaced apart from each other;

coolant circulation means positioned between said inner wall and said outer wall to cool the interior of said tank structure;

make-up water means extending longitudinally in said tank structure to add water to said tank structure without creating water turbulence within said tank structure; and adjustable water over-flow means extending longitudinally in said tank structure to remove excess water from said tank structure without creating water turbulence within said tank structure.

11. The vacuum tank of claim 10 wherein said coolant circulation means comprises tubing positioned between said inner wall and said outer wall to receive pumped coolant and circulate said coolant in a tortuous path between said inner wall and said outer wall.

12. The vacuum tank of claim 10 wherein said make-up water means comprises an elongated tube positioned longitudinally within said tank structure adjacent the bottom of said tank structure, said elongated tube having a plurality of holes formed therein to direct water from within said tube downwardly and outwardly toward the bottom and sides of said tank structure, said elongated tube being at all times below the water level within said tank structure.

13. The vacuum tank of claim 10 wherein said adjustable water over-flow means comprises an elongated cylindrical tube positioned longitudinally within said tank structure and having slot means extending along its length so that water entering said slot means is conducted through said tube and into an over-flow drain conduit for removal from said tank structure; said elongated tube being rotatable about its axis to position said slot means at variable distances above the bottom of said tank structure whereby the depth of water within said tank structure may be adjusted.

14. The vacuum tank of claim 12 wherein said make-up water means has said elongated tube positioned so that said plurality of holes are directed downwardly at substantially a 45° angle from the vertical on each side of said elongated tube and said plurality of holes emit make-up water into said tank structure with minimum turbulence.

* * * * *